United States Patent [19]
Lax et al.

[11] 3,808,554
[45] Apr. 30, 1974

[54] OPTICAL RESONANT CAVITY STRUCTURE
[75] Inventors: Melvin Lax; Donald Frederick Nelson, both of Summit, N.J.
[73] Assignee: Bell Telephone Laboratories, Incorporated, Murray Hill, N.J.
[22] Filed: May 9, 1973
[21] Appl. No.: 358,722

[52] U.S. Cl. .................................... 331/094.5 C
[51] Int. Cl. .................................... H01s 3/08
[58] Field of Search .................................... 331/94.5

[56] References Cited
OTHER PUBLICATIONS
Ananev, Soviet J. of Quantum Electronics, Vol. 1, No. 6, May–June, 1972, pp. 565–586.
Casperson, J. Optical Society of America, Vol. 63, No. 1, Jan. 1973, pp. 25–29.
Checcacci et al., Applied Optics, Vol. 10, No. 6, June, 1971, pp. 1,363 to 1,370.

Primary Examiner—Ronald L. Wibert
Assistant Examiner—R. J. Webster
Attorney, Agent, or Firm—G. S. Indig

[57] ABSTRACT

A highly directional laser cavity depends upon a specified complex mirror to result both in high mode coupling of the fundamental transverse mode and to cause this lowest order mode to feed on essentially all of the excited state volume thus suppressing higher order modes. The mirror structure includes a central region which is convex and a peripheral region which is concave, both as viewed from the inside of the cavity.

11 Claims, 1 Drawing Figure

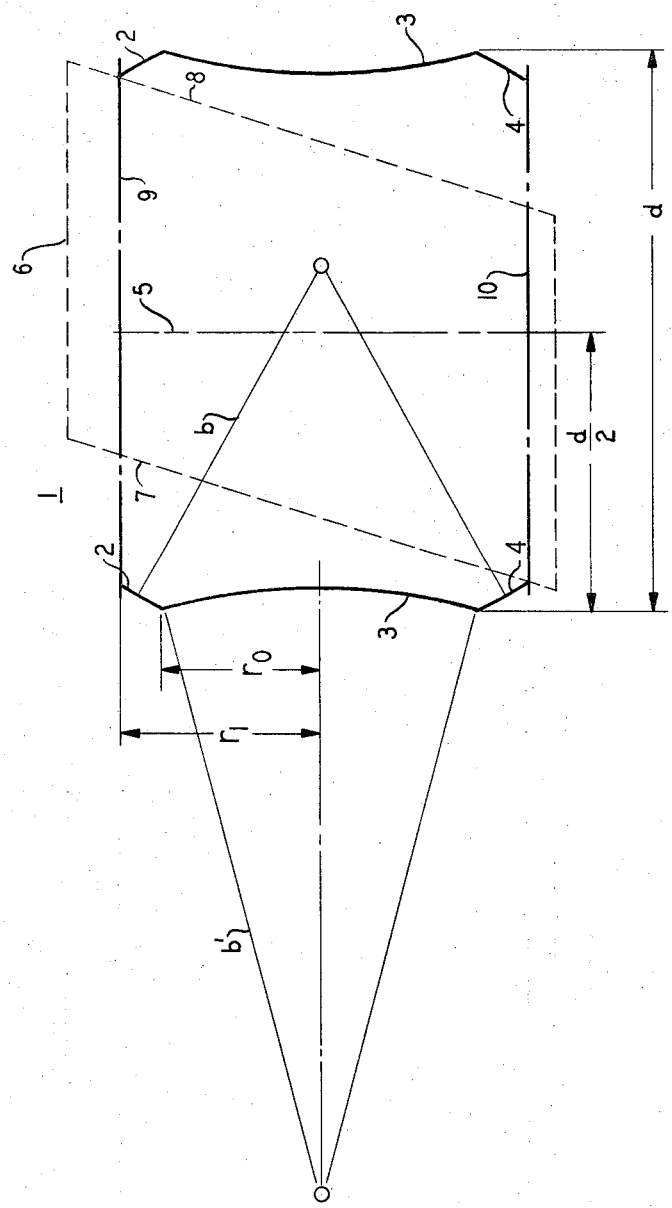

OPTICAL RESONANT CAVITY STRUCTURE

BACKGROUND OF THE INVENTION

1. Field of the Invention

The invention is concerned with optical cavity configurations.

2. Description of the Prior Art

An expected characteristic of the laser coherent light source prior to its experimental realization was high directionality. The flat, parallel mirror arrangement of the Fabry-Perot cavity augured well for essentially pure mode, essentially flat wave front emission, with focusing limited only by edge diffraction effects.

Within a short period of first experimental verification, it was realized that flat mirror configurations required great rigidity, high perfection in fabrication, and considerable skill in alignment. Failure in attaining any of these requirements led to large diffraction losses from the cavity.

A solution to these problems soon resulted in the now commonly accepted expedient of using spherical or curved end members for the cavity. Some early structures used truly confocal end members but later structures have not been confocal in the strict sense (although this terminology has found continued usage). Curved mirrors facilitated the alignment problem and led to very low diffraction losses but tended to produce a waist in the energy cross section defining the fundamental transverse mode. Since the entire content of the cavity is pumped, the result is to couple only a small fraction of the excitation power into the fundamental transverse mode, the mode possessing the greatest directionality. This permits generation of higher order (and less directional) transverse modes which feed on the excited medium outside the volume in which the fundamental mode predominates. Use of curved end members, therefore, aggravates the problem of obtaining optimum directionality in a laser beam.

A number of workers have devised a variety of configurations designed to improve directionality. An early design utilizes one or a series of aperture plates within the cavity (see 2, *Quantum Electronics Proceedings*, 1437, Columbia University Press, Grivet and Blumbergen (1964)). Directionality is significantly improved by this arrangement but the large part of the cavity volume outside the apertures is no longer a useful part of the oscillator so that pump efficiency is significantly reduced.

A different approach depends upon one or more extra mirrors which through interference effects prevents build up of unwanted laser modes. See, for example, 41, *Bell System Technical Journal*, page 453 (1962). This approach causes mutual interference of longitudinal modes near the fundamental. It, however, does not result in limiting of the relatively closely spaced transverse modes.

A diverging mirror arrangement (see, for example, 3, *IEEE Journal of Quantum Electronics*, 156 (1967)) does result in substantial loss of higher order transverse modes through diffraction and somewhat increases the mode volume of the fundamental mode, however, spillover losses are necessarily substantial in the fundamental mode.

A recently suggested etalon configuration described in 10, *Applied Optics*, page 1,363 (1971) takes the general form of the plane mirror Fabry-Perot. The design innovation takes the form of a rim about each of the end mirrors with the rims being generally convex as viewed from the inside of the cavity. The purpose of this design is to minimize diffraction losses by capturing and redirecting wave energy at the periphery of the etalon. Numerical results included in that paper show a significant improvement in loss, typically 85 percent or better. As the reported results in that paper clearly indicate, however, reduction in diffraction loss is accompanied by reduction in mode volume. As an example, the configuration resulting in 85 percent reduction in diffraction loss results also in a 13 percent reduction in mode volume. Reduction in mode volume, by which is meant reduction in fundamental transverse mode volume, necessarily results in generation of higher order modes which feed on the excited state volume outside the fundamental. See, 43, *Journal of Applied Physics*, page 3,136.

SUMMARY OF THE INVENTION

A variation on the basic Fabry-Perot cavity results in significantly improved mode coupling of the fundamental transverse mode. The cavity which may serve as a laser cavity or may house a parametric oscillator or other optical generator has at least one end mirror having a central portion which is convex surrounded by a rim portion which is concave both as viewed from the inside of the cavity. The resulting cavity energy cross section for the first order transverse mode encompasses a large fraction of the total cavity volume. Mode coupling of the fundamental transverse mode is consequently high with this mode feeding on a correspondingly large fraction of the excited state volume. In effect, the configuration provides for "saturation" by the fundamental mode and in consequent suppression of higher order transverse modes. Thus high directionality as well as efficient use of the excited volume and of the power needed to generate the excited volume are obtained.

The convex portion of an end mirror acts as an unstable resonator and expands the mode volume (always referring to lowest order mode). The concave rim serves the general purpose of the rim described in 10, *Applied Optics*, p. 1,363 (1971), in minimizing diffraction loss. Cavities, in accordance with invention, may be defined by two mirrors of the type described or may use but a single complex mirror with a mating plane mirror.

The precise geometric shape of the portions of the complex mirror is not critical. For ease of fabrication, it is generally preferred that both portions be spherical; and specific design parameters in this detailed description are generally in such terms. The general advantages of the inventive structure are, however, preserved for mirrors of other shape. So, the central convex portion may, for example, be parabolic and the concentric outer or rim portion may define a portion of a cone. Further, these concentric portions may join one another smoothly, e.g., may be produced by shaping a single blank.

Parameters of design significance are discussed in terms of Fresnel numbers corresponding with two mirror portions of the complex mirror, radii of curvature of each of the two portions (on the usual assumption that they are spherical), and the spacing between mirrors. Discussion is in terms of mirrors which accomplish the necessary function—i.e., that of a cavity in which energy is spread in a central region and is captured by convergence at the periphery. Equivalent structures utilizing refractive elements whole or in part may be constructed on the basis of fundamental optical principles—e.g., a single lens having concentric inner double concave section and peripheral double convex section may be placed between plane mirror ends.

BRIEF DESCRIPTION OF THE DRAWING

The FIGURE is a schematic view of a cavity in accordance with the invention.

DETAILED DESCRIPTION

1. The FIGURE

Cavity 1 depicted consists of at least one complex end mirror 2 consisting of a convex central section 3 and a rim or concave portion 4. Plane mirror 5, shown in phantom together with a first complex mirror 2, may define a cavity in accordance with the invention. Alternatively, the cavity may be defined by a pair of complex mirrors 2 each consisting of convex portions 3 and concave portions 4. Other designations included on the FIGURE and alluded to under a subsequent section entitled "Design Parameters" are $d$, representing the spacing between two complex mirrors 2 (an equivalent structure utilizing a plane mirror 5 has a spacing of $d/2$); $b$, the radius of curvature of concave portion 2; $b'$, the radius of curvature of convex portion 3; $r_0$, half the diameter of the convex portion 3; and $r_1$, half the diameter of the entirety of complex mirror 2.

Provision for containing an active medium is shown in phantom either as body 6 provided with Brewster angle ends 7 and 8. (Body 6 may be a fluid in which event the shape is defined by a container.) Alternatively, an active medium may take a form including mirrors such as 2 and sides 9 and 10.

2. General Considerations

Design objectives for the inventive configuration are high power and high directionality. Designs of the invention inherently result in efficient utilization of pump power so that lasers are characterized by a very high brightness (power per unit area per unit solid angle) per unit of pump power.

The design of lasers of ever-increasing power takes the form of increased length and increased transverse dimension to increase the amount of active medium exposed to the pump. Increasing laser length results in improved directionality, since higher length-to-width aspect ratio results in predominance of the lowest order transverse mode. Cavity length is, however, limited by practical considerations, and it eventually becomes expedient to increase active volume by increasing the transverse dimension of the cavity.

The goals of minimizing diffraction loss (escape of energy from the sides of the cavity) and of efficient use of pump energy have been in conflict. In one class of structures, this type of loss is minimized by the use of confocal, or, more generally, of curved mirrors. This arrangement has the added advantage of expediting mirror alignment. The result of all of these considerations is poor mode coupling of the lowest order transverse mode, since curved mirrors inherently restrict the coupled volume to one which is constricted in the center of the cavity. This, in turn, permits higher order transverse modes to feed on the remainder of the excited volume. Such higher order transverse modes result in a less directional exiting wave front then the lowest order transverse (fundamental) mode. This design approach, therefore, results in inherent limits on directionality.

The major objective of the inventive teaching is to couple the lowest order transverse mode to as much of the excited volume as possible. Since coupling to the entirety of the excited volume inherently results in significant diffraction loss, this ambition must be compromised.

The general approach utilizes at least one spreading mirror taking the form of a convex central section of at least one of the end mirrors to expand mode volume (reference to "mode volume" in this description is intended to refer to the mode volume of the lowest order transverse mode). A concave rim portion of such complex mirror is designed to yield a small diffraction loss.

It has been indicated that general discussion is in terms of complex mirrors which may be considered as constructed of two spherical portions. This embodiment is considered preferred because of ease of fabrication. Sections of a complex mirror may be separately constructed on available lapping equipment, and such sections may afterwards be fitted together to form the entire mirror. Very long radii of curvature for the convex portion may result from elastic distortion of a plane mirror which, to a first approximation, may also define a generally spherical section.

The inventive teaching is more fundamental in principle and relies only on a central unstable resonator portion with light contained by a generally concave rim portion. While precise design for optimum structures is somewhat more complex, a reasonable approximation for non-spherical sections may be based on average radii of curvatures for the various segments.

3. Design Parameters

Parameters set forth in this section are based on an experimental model as expanded by a large number of computer determinations. Parameters are generally those set forth in the FIGURE. Since the radial dimensions $r_0$ and $r_1$ are wavelength dependent for an optimum structure, it is convenient to set forth design considerations in terms of the Fresnel numbers $N_0$ and $N_1$ defined respectively as:

$$N_0 = r_0 2/\lambda d \text{ and } N_1 = r_1 2/\lambda d.$$

where $\lambda$ is the wavelength of the electromagnetic radiation in the cavity.

High power structures are likely to have dimension $d$ of the order of meters and overall radial dimension $r_1$ of the order of a meter or less. Where directionality and efficient utilization of pump rather than total power are prime considerations, dimensions may be somewhat reduced, finally attaining the very small dimensions of a miniature laser designed for separate transmission line oscillator use. In this extreme, $d$ and $r_1$ may both be of the order of millimeters.

A parameter of primary consequence is the fraction $d/b'$. Studies indicate that this fraction is desirably within the limits of from $10^{-3}$ to $10^{-1}$. The significance of this fraction in the terms of an exemplary structure of $d = 1$ meter is set forth:

$b'$, the radius of curvature of the convex portion of an end mirror, is desirably within the limits of from about 1,000 meters to about 10 meters. Within limits, a figure of merit increases for increasing values of $b'$. The essential function of the convex portion of the mirror—i.e., that of spreading wave energy to fill essentially the entirety of the cavity—is not retained for flat central mirror sections—i.e., $b' = \infty$. The maximum limit set forth is largely practical in nature and is designed to differentiate between the convex section, which is the essence of the inventive structure, and a flat section. As $b'$ is reduced to dimensions approaching and less than the minimum of 10 meters diffraction losses are increased with wave energy escaping from the cavity before encounter with the rimmed portion of a mating mirror or alternatively with an optional flat mirror placed at half the spacing of such a mating mirror.

A second parameter of consequence is $d/b$. It has been determined that this fraction should lie between the numerical limits of about 2 to $10^{-3}$. Again based on $d = 1$ meter, this is equivalent to a $b$ range of from 0.5 to 1,000 meters. It is difficult to isolate this or other parameters, but it may generally be stated that the limits on $b$ are designed to first capture and retain energy, and, in conjuction with the remainder of the complex mirror, to uniformly disperse such energy. The maximum limit on the $d/b$ fraction is apparent. Larger values result in the directing of captured energy out of the cavity, either prior to encounter with the peripheral portion of a mating complex mirror or prior to encounter with itself upon reflection by a mating flat mirror.

The final design parameter of major significance is the fraction of the two Fresnel numbers $N_0/N_1$. Broad limits are purely geometrical and are set as from 0.01 to 0.99. The minimum $N_0/N_1$ of 0.01 defines a configuration which significantly deviates from a spherical mirror of radius $b$ while the maximum value of 0.99 defines a structure which deviates significantly from an unstable resonator of spherical configuration having a radius $b'$.

It is apparent that all parameters are intimately interrelated. In general, it is desirable that the $N_0/N_1$ ratio approach unity—i.e., that it have a value of from about 0.5 to about 0.95. For optimum structures, as the Fresnel numbers get larger, radii of curvature of the convex portion of the mirror ($b'$) gets larger relative to the mirror separation. Generally as Fresnel number $N_1$ gets larger losses per pass decrease.

4. Examples

The following are presented as exemplary of a variety of structures in accordance with the invention and each is presented partly in graphical form on coordinates of relative amplitude and $r/r_1$ where $r$ is the radial distance plotted from the axial center of the cavity. The loss, L, is given as a percentage per pass through the cavity.

Example 1

$N_0 = 6.5 \; N_1 = 8.6 \; d/b = 0.1$

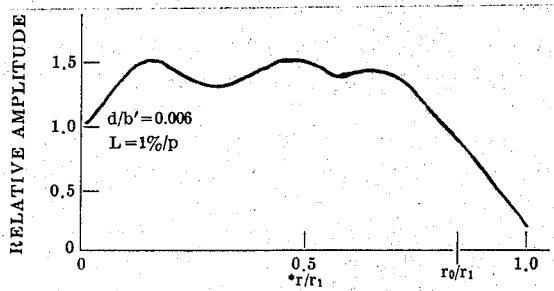

Example 2

$N_0 = 3.4 \; N_1 = 4.6 \; d/b = 0.1$

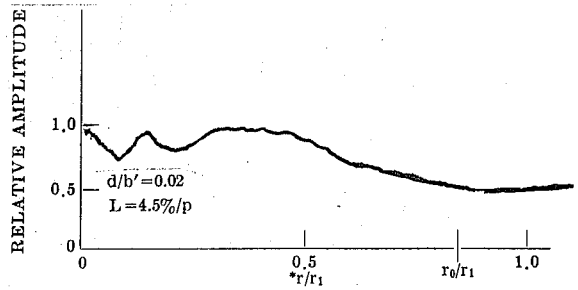

Example 3

$N_0 = 1.5 \; N_1 = 2.0 \; d/b' = 0.1$

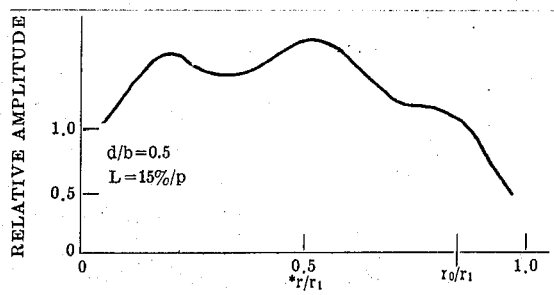

*$r/r_1$=radical distance divided by $r_1$

What is claimed is:

1. Optical resonant cavity defined by first and second end mirrors at least one of which has a peripheral portion which is concave as viewed from the inside of the cavity, characterized in that the central portion of the at least one said mirror is convex as viewed from the inside of the cavity with the geometric form of the said at least one mirror being such that the Fresnel number ratio $N_0/N_1$ is numerically equal to a value within the range of from 0.01 to 0.99 where $N_0$ and $N_1$ are defined as $r_0 2/\lambda d$ and $r_1 2/\lambda d$, respectively, where $r_0$ is equal to the radial dimension of a plane projection of the convex section of the said at least one mirror, $r_1$ is numerically equal to the radial dimension of a plane projection of the entirety of the said at least one mirror, $\lambda$ is the wavelength of the electromagnetic radiation in the cavity, and $d$ is either the axial spacing between two mirrors as defined or twice the axial spacing of the said first mirror and a plane mating end mirror.

2. Optical resonant cavity of claim 1 defined by two mating mirrors of the configuration of the said at least one mirror.

3. Optical resonant cavity of claim 1 defined by the said at least one mirror and a plane end mirror.

4. Optical resonant cavity of claim 1 in which the said convex portion is approximately a spherical section.

5. Optical resonant cavity of claim 4 in which the fraction $d/b'$ is numerically equal to a value within the range of from $10^{-3}$ to $10^{-1}$ where $b'$ is the radius of curvature of the said convex portion of the said at least one mirror.

6. Optical resonant cavity of claim 1 in which the said peripheral portion approximately defines a spherical section.

7. Optical resonant cavity of claim 6 in which the fraction $d/b$ is numerically equal to a value within the range of from 2 to $10^{-3}$ where $b$ is the radius of curvature of the peripheral portion of the said at least one mirror.

8. Optical resonant cavity of claim 1 provided with an active laser medium contained between the said mirrors.

9. Optical resonant cavity of claim 8 in which the said active medium is a body having Brewster angle ends.

10. Optical resonant cavity of claim 9 in which the said active medium is a fluid and the said body is defined by a container.

11. Optical resonant cavity of claim 8 in which the active medium is a solid.

* * * * *

UNITED STATES PATENT OFFICE
CERTIFICATE OF CORRECTION

Patent No. 3,808,554     Dated April 30, 1974

Inventor(s) Melvin Lax and Donald F. Nelson

It is certified that error appears in the above-identified patent and that said Letters Patent are hereby corrected as shown below:

Column 4, line 46, change "No=$r_o2/\lambda d$ and N1=$r_12/\lambda d$" to read
--$N_0 = r_0^2/\lambda d$ and $N_1 = r_1^2/\lambda d$--.

Column 6, line 40, change "$r_o2/\lambda d$ and $r_12/\lambda d$" to read
--$r_0^2/\lambda d$ and $r_1^2/\lambda d$--.

Signed and sealed this 31st day of December 1974.

(SEAL)
Attest:

McCOY M. GIBSON JR.
Attesting Officer

C. MARSHALL DANN
Commissioner of Patents